Figure 1:
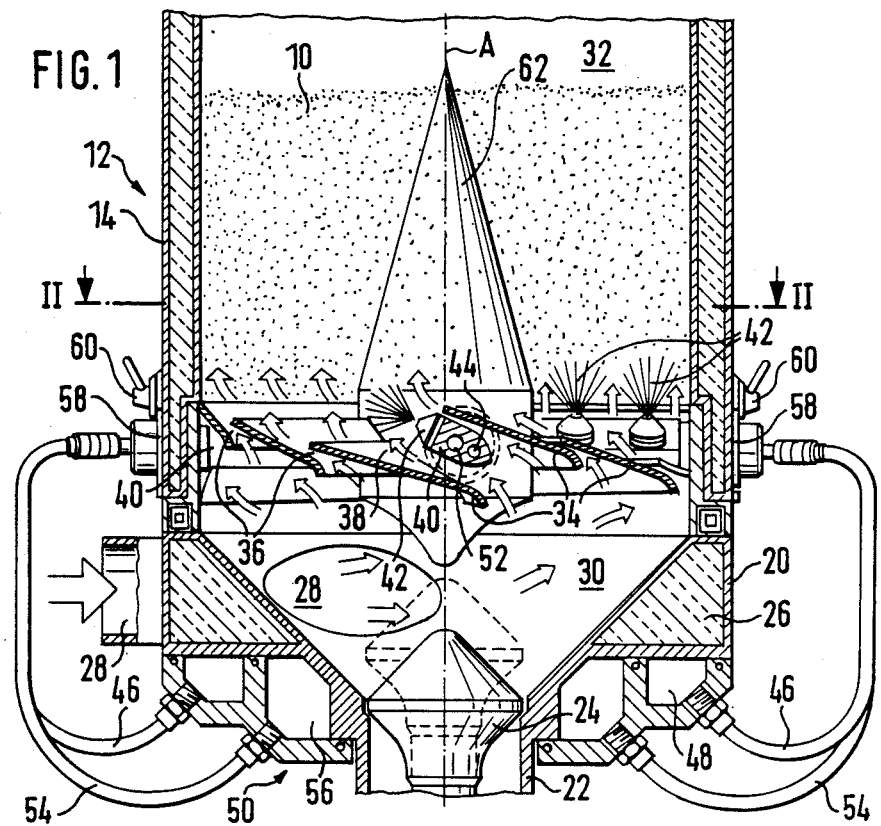

United States Patent [19]

Hüttlin

[11] Patent Number: 4,970,804

[45] Date of Patent: Nov. 20, 1990

[54] FLUIDIZED BED APPARATUS FOR THE PRODUCTION AND/OR FURTHER TREATMENT OF GRANULATE MATERIAL

[76] Inventor: Herbert Hüttlin, Daimlerstrasse 7, 7853 Steinen, France

[21] Appl. No.: 422,414

[22] Filed: Oct. 17, 1989

[30] Foreign Application Priority Data

Nov. 24, 1988 [DE] Fed. Rep. of Germany ....... 3839723

[51] Int. Cl.⁵ .............................................. F26B 17/00
[52] U.S. Cl. .................................. 34/57 A; 34/57 R; 34/57 B
[58] Field of Search ................. 34/57 A, 57 B, 57 C, 34/10, 57 R; 432/15, 58

[56] References Cited

U.S. PATENT DOCUMENTS

| | | | |
|---|---|---|---|
| 4,115,929 | 9/1978 | Staub et al. | 34/57 A |
| 4,320,089 | 3/1982 | Hüttlin | 34/57 A |
| 4,530,169 | 7/1985 | Okawara | 34/57 B |
| 4,588,366 | 5/1986 | Glatt | 34/57 A |
| 4,685,809 | 8/1987 | Hüttlin | 34/57 A |
| 4,697,356 | 10/1987 | Hüttlin | 34/57 A |

FOREIGN PATENT DOCUMENTS

| | | |
|---|---|---|
| 2551578 | 5/1977 | Fed. Rep. of Germany . |
| 0103894 | 9/1983 | Fed. Rep. of Germany . |
| 0125516 | 4/1984 | Fed. Rep. of Germany . |
| 1187567 | 4/1970 | United Kingdom . |

OTHER PUBLICATIONS

N.T.I.S. Technical Notes, Nr. 7, Teil D. Juli 1986, Seite 808, Springfield, Virginia, U.S.; "Agglomeration-Free Distributor for Fluidized Beds".

Primary Examiner—Henry A. Bennet
Assistant Examiner—Denise L. Ferensic
Attorney, Agent, or Firm—Brumbaugh, Graves, Donohue & Raymond

[57] ABSTRACT

A container (12) which is arranged at least approximately rotational symmetrical with respect to an at least approximately vertical container axis (A) has an interior which is made up of an inlet chamber (30) adapted to be traversed from the bottom to the top by a gas, in particular dry air, and a vortex chamber (32) which is arranged above the inlet chamber (30) and formed for fluidizing the material (10). Between the inlet chamber (30) and vortex chamber (32) a ring of guide plates (34) is arranged which, seen in the direction of the container axis (A), overlap each other and impart a twist to the upwardly directed gas flow. Between the guide plates (34) lances (40) are arranged at least approximately radially to the container axis (A) and each comprise at least one nozzle (42) arranged in the flow direction of the gas for introducing granulation substances into the vortex chamber (32). By the nozzles (42) large amounts of pulverulent and/or liquid substance per unit time may be sprayed into the vortex chamber (32) without the material forming lumps in uncontrollable manner or appreciable amounts of the substance depositing in the container (12).

11 Claims, 4 Drawing Sheets

FLUIDIZED BED APPARATUS FOR THE PRODUCTION AND/OR FURTHER TREATMENT OF GRANULATE MATERIAL

The invention relates to fluidized bed apparatus for the production and/or further treatment of granulate material comprising
   a container which is at least approximately rotational symmetrical with respect to an at least approximately vertical container axis and the interior of which is made up of
   an inlet chamber adapted to be traversed from the bottom to the top by a gas, in particular dry air, and
   a vortex chamber which is arranged above the inlet chamber and formed for fluidizing the material and
   a ring of guide plates which impart a twist to the upwardly directed gas flow between inlet chamber and vortex chamber and
   nozzles for introducing granulation materials into the vortex chamber.

In a known fluidized bed apparatus of this type (EP 0103894B1) the inlet chamber is formed by a dish which surrounds a lower end portion of an immersion tube disposed vertically in the container. At an upper cylindrical inner wall portion of the dish guide plates are mounted which project radially inwardly up to the immersion tube. At a distance above the guide plates nozzles are mounted on the immersion tube and are directed obliquely upwardly and can be fed with liquids for moistening, lacquering and/or coating a material contained in the container.

The invention is based on the problem of further developing an apparatus of the type described so that for a given size of the apparatus and given gas throughput per unit time larger amounts of pulverulent and/or liquid substance per unit time can be sprayed into the container without the material forming lumps in uncontrollable manner or appreciable amounts of substance depositing in the container.

The problem is solved according to the invention with a fluidized bed apparatus of the type described in which
   the guide plates overlap each other, seen in the direction of the container axis, and
   between the guide plates lances are arranged at least approximately radially to the container axis and each have at least one nozzle arranged in the flow direction of the gas.

By the overlapping of the guide or baffle plates the gas flowing between them is divided into individual substantially laminar subflows of which the flow direction is fixed by the arrangement of the guide plates sufficiently accurately to define an optimum nozzle direction. In at least some of these subflows of the gas one of the lances according to the invention is arranged thereby giving venturi effects in these subflows. This means that on the lee side of the lances a relative partial vacuum forms which assists the nozzles in carrying pulverulent and/or liquid substances finely distributed into the vortex chamber. The fluidized material already contained in the vortex chamber or forming from the substances sprayed in is thoroughly but nevertheless gently mixed by the vigorous twist of the subflows. As a result the finish-treated material is particularly homogeneous. Depending on the detailed configuration of the fluidized bed apparatus the treatment may be batchwise or continuous.

Advantageous further developments of the invention are set forth in the subsidiary claims.

Figure 2:
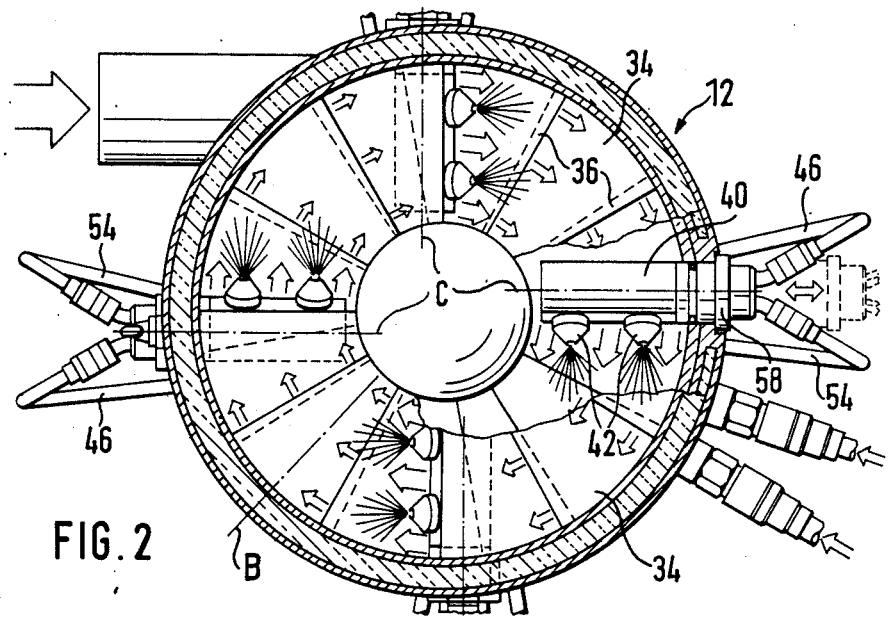
Figure 3:
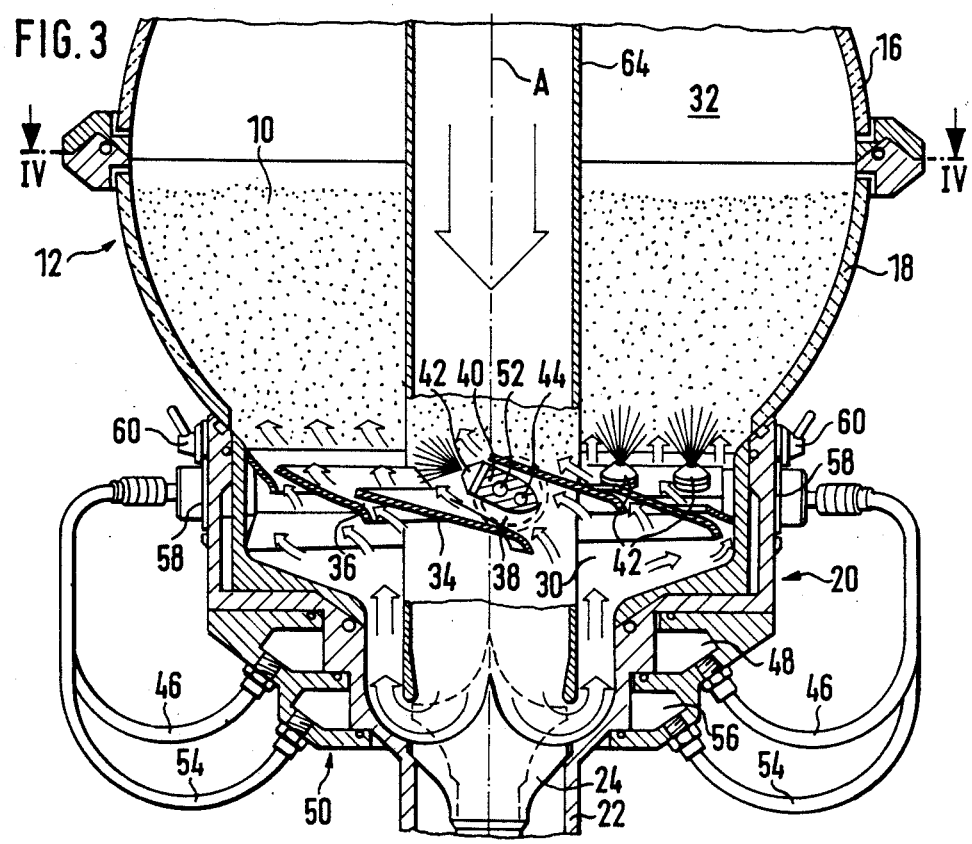
Figure 4:
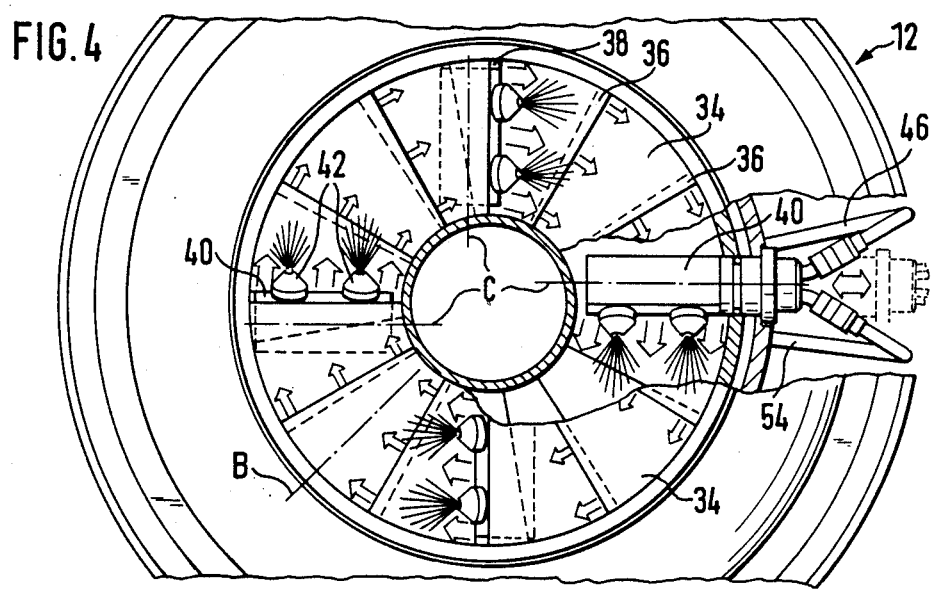
Figure 5:
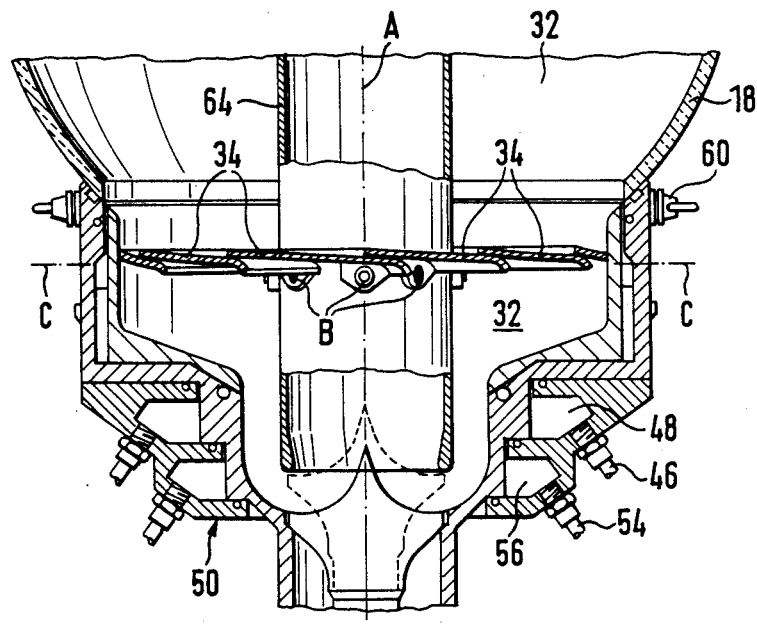
Figure 7:
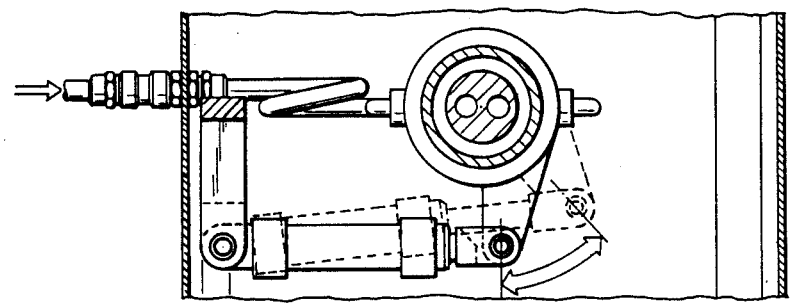
Figure 6:
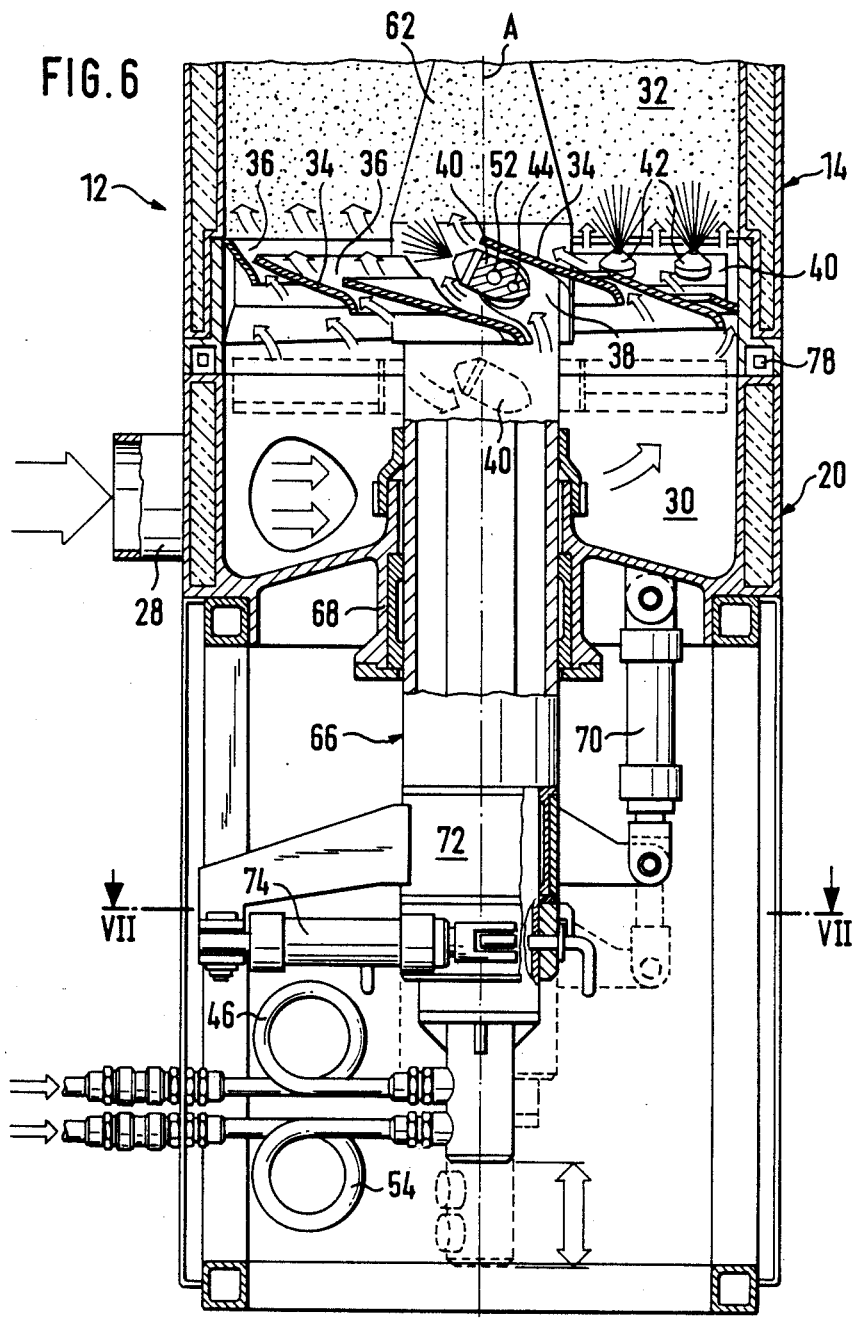

Hereinafter examples of embodiment of the invention will be explained with further details with the aid of schematic drawings, wherein:

FIG. 1 is a vertical section of a first apparatus according to the invention in operation, FIG. 2 is the horizontal section II—II of FIG. 1, FIG. 3 is a vertical section of a second apparatus according to the invention in operation, FIG. 4 is the horizontal section IV—IV of FIG. 3, FIG. 5 is a vertical partial section corresponding to FIG. 3 but in the rest position of the apparatus, FIG. 6 is a vertical section of a third apparatus according to the invention and FIG. 7 is the horizontal partial section VII—VII of FIG. 6.

In all the embodiments illustrated the object of the apparatuses according to the invention is to produce granulate material 10 either from pulverulent and/or liquid substances, possibly proceeding from starter nuclei, or further treat such material, for example for coating. For this purpose a container 12 is provided which is arranged at least approximately rotational symmetrical with respect to an at least approximately vertical container axis A.

According to FIGS. 1 and 6 the container 12 has a cylindrical main body 14 but according to FIGS. 3 to 5 a substantially spherical main body which is made up of an upper sphere segment 16 and a lower sphere segment 18. The container 12 includes in each case an annular container base 20; in the embodiment according to FIGS. 1 to 5 said base opens into a central vertical tube 22 which can be completely or partially sealed with a vertically adjustable stopper 24 and is employed inter alia for emptying the container 12. In the embodiments according to FIGS. 1 and 2 and FIGS. 6 and 7 the main body 14 and base 20 of the container 12 are made double-walled and provided with thermal insulation 26.

In all the embodiments illustrated the container base 20 comprises an inlet 28 through which relatively dry heated processed air can be introduced tangentially into the inlet chamber 30. Alternatively, in the embodiments according to FIGS. 1 and 2 as well as FIGS. 3 to 5 the necessary process air can be introduced into the inlet chamber 30 through the central tube 22 when the stopper 24 is slightly raised.

The inlet chamber 30 is separated from a vortex chamber 32 arranged above it in the container 12 by a propeller-like but non-rotating ring of guide plates 34. In each of the examples illustrated twelve guide plates 34 are provided which in accordance with FIG. 5 are each pivotally adjustable about a pivot axis B radial with respect to the container axis A. In their operating position the guide plates 34 according to FIGS. 1 and 3 are inclined about 75° to the container axis A; adjacent guide plates overlap each other as can be seen from FIGS. 2 and 4. Even if the guide plates 34 are inclined to the container axis A about a smaller angle of for example 65° overlapping still remains between adjacent guide plates.

All the guide plates 34 are pivotal about their pivot axis B into a rest position in which according to FIG. 5 they are inclined almost 90° to the container axis A and bear substantially sealingly on each other. In the rest position it is possible to introduce into the vortex chamber 32 for example a charge of starter nuclei for making the material 10 without an appreciable amount therof being able to drop into the inlet chamber 30.

In the operating position the guide plates 34 leave between them passages 36 and 38 of different width. If in one of the plan views according to FIG. 2 or 4 the guide plate 34 which starts substantially in the 12 o'clock position of a clock hand and extends somewhat beyond the one o'clock position is defined as the first guide plate then between the first and second guide plate and between the second and third guide plate in each case a narrow passage 36 is formed whilst between the third and fourth guide plate a wide passage 38 is provided. This sequence repeats itself in all four quadrants so that with the illustrated number of twelve guide plates 34 eight narrow passages 36 and four wide passages 38 are present.

In each of the wide passages 38 a lance 40 is disposed and has a longitudinal axis C radial with respect to the container axis A and is rotatably adjustable about said longitudinal axis. Each of the total of four lances 40 in the examples illustrated has a streamline profile which corresponds substantially to a horizontal section through a ship's hull and considerably narrows the associated passage 38, this being the case to a greater extent at the upper side of the respective lance 40 than at the lower side thereof. The process air therefore flows through each of the wide passages 38 mainly beneath and only to a lesser extent above the lance 40 arranged there.

In the examples of embodiment according to FIGS. 1 to 5 the lances 40 are inserted radially from the outside to the inside in each case through a bore in the main body 14 or container base 20. Each of the lances 40 comprises a plurality, two in the example of embodiment illustrated, of nozzles 42 which are directed upwardly inclined at least approximately in the flow direction of the process air flowing through between the adjacent guide plates 34. Depending on the pivot position of the guide plates 34 each of the lances 40 is covered in operation by the guide plate 34 associated therewith so that it is at the most partially visible from above. In contrast the nozzles 42 are free so that they cannot spray the guide plate 34 disposed above them even when the flow of the process air is set weaker than intended.

The nozzles 42 in the examples illustrated are two-material nozzles for spraying a liquid which is atomized with spraying air. The lances 40 accordingly each contain a liquid passage 44 which extends parallel to their longitudinal axis C and which is connected via a flexible tube 46 and according to FIGS. 1 to 5 via an annular passage 48 to a liquid source. The annular passage 48 is formed in a base ring 50 which is pushed from below onto the container base 20 and sealed with respect to the latter. Furthermore, in each lance 40 likewise parallel to the longitudinal axis C thereof a spraying air passage 52 is provided which is connected via a flexible tube 54 and according to FIGS. 1 to 5 via a second annular passage 56 in the base ring 50 to a compressed air source.

In accordance with FIGS. 1 to 5 each of the lances 40 comprises a circular flange 58 which is clamped with a clamping device 60 disposed externally on the container 12 or container base 20 in a selected rotational angle position of the associated lance 40. On the flange 58 a scale may be provided which makes it easier to set a certain rotational angle, which has proved favourable, of the associated lance 40. The clamping devices 60 may be pivoted away so that the lances 40 can be pulled radially outwardly out of the container 12. The space freed by the lances 40 is then occupied by the adjacent guide plates 34 when they are pivoted into their rest position according to FIG. 5.

In the embodiment according to FIGS. 1 and 2 and FIGS. 6 and 7 within the vortex chamber 32 a displacement body in the form of a cone 62 with upwardly directed tip is arranged coaxially with the container 12.

In the embodiment according to FIGS. 3 to 5 a displacement body is likewise provided; however, said body is an immersion tube 64 which is inserted from above coaxially into the container 12 and extends into the vicinity of the stopper 24. The process air in this embodiment is introduced through the immersion tube 64 and deflected by the correspondingly shapedstopper 24 upwardly into the inlet chamber 30.

In the embodiment according to FIGS. 6 and 7 the guide plates 34 and lances 40 are mounted on a central container insert 66. Said container insert 66 is a tube which extends vertically downwardly and is guided in a guide bush 68 in the container base 20 and can be moved up and down. For this adjustment movement an axis-parallel piston-cylinder unit 70 is provided which is suspended on the container base 20 and carries a support ring 72 on which the container insert 66 is supported. The container insert 66 is further connected to the support ring 72 by a tangential piston-cylinder unit 74 in such a manner that it can also be rotated. By simultaneous actuation of the two piston cylinder units 70 and 74 the container insert 66 can move helically so that it assumes optionally the operating position shown in full line in FIG. 6 or the rest position shown in dashed line. In the rest position the main body 14 of the container 10 can be removed without any danger of damaging the guide plates 34 and nozzles 42. In the operating position the main body 14 is sealed with respect to the base 20 of the container 10 by an inflatable seal 78.

A variant which is not illustrated resides in combining features of FIGS. 3 and 6 so that the central container insert 66 comprises an immersion tube 64 through which heated air or other gas can be introduced from above into the inlet chamber 30.

I claim:

1. Fluidized bed apparatus for the production and/or further treatment of granulate material comprising
a container which is at least approximately rotational symmetrical with respect to an at least approximately vertical container axis (A) and the interior of which is made up of
an inlet chamber adapted to be traversed from the bottom to the top by a gas, and
a vortex chamber which is arranged above the inlet chamber and formed for fluidizing the material and
a ring of guide plates which impart a twist to the upwardly directed gas flow between inlet chamber and vortex chamber and
nozzles for introducing granulation materials into the vortex chamber, characterized in that
the guide plates overlap each other, seen in the direction of the container axis (A), and
between the guide plates lances are arranged at least approximately radially to the container axis (A) and each have at least one nozzle arranged in the flow direction of the gas.

2. Fluidized bed apparatus according to claim 1, characterized in that each lance considered from above in the direction of the container axis (A) is at least partially covered by the guide plate arranged there-above.

3. Fluidized bed apparatus according to claim 1 or 2, characterized in that the guide plates are each pivotal about a radial pivot axis (B) out of an operating position into a rest position in which they separate the vortex chamber from the inlet chamber.

4. Fluidized bed apparatus according to claim 3, characterized in that the guide plates are inclined in their operating position 65° to 85° to the container axis (A).

5. Fluidized bed apparatus according to claim 1, characterized in that the lances are rotatably adjustable about their own respective longitudinal axis (C).

6. Fluidized bed apparatus according to claim 1, characterized in that the lances are mounted on a common pot-shaped container base.

7. Fluidized bed apparatus according to claim 6, characterized in that the lances extend at least approximately up to an immersion tube which is arranged in the container, coaxial with the latter and provided for introduction of gas into the inlet chamber.

8. Fluidized bed apparatus according to claim 1, characterized in that the lances and guide plates are mounted on a central container insert.

9. Fluidized bed apparatus according to claim 8, characterized in that the central container insert comprises an immersion tube for introducing gas into the inlet chamber.

10. Fluidized bed apparatus according to claim 1, characterized in that the nozzles are multiple substance nozzles.

11. Fluidized bed apparatus for the production and/or further treatment of granulate material as set forth in claim 1, wherein said inlet chamber is adapted to be traversed from the bottom to the top by dry air.

* * * * *

UNITED STATES PATENT AND TRADEMARK OFFICE
CERTIFICATE OF CORRECTION

PATENT NO. : 4,970,804

DATED : November 20, 1990

INVENTOR(S) : Herbert Huttlin

It is certified that error appears in the above-identified patent and that said Letters Patent is hereby corrected as shown below:

Title page, Item [76], "France" should read --Fed. Rep. of Germany--.

Signed and Sealed this

Twenty-first Day of April, 1992

Attest:

HARRY F. MANBECK, JR.

*Attesting Officer*  *Commissioner of Patents and Trademarks*